United States Patent Office 3,565,973
Patented Feb. 23, 1971

3,565,973
PURIFYING CROSS-LINKED POLYELECTROLYTES
Alan S. Michaels, Lexington, Mass., assignor to Amicon Corporation, Lexington, Mass., a corporation of Massachusetts
No Drawing. Continuation-in-part of application Ser. No. 340,531, Jan. 27, 1964. This application Nov. 14, 1967, Ser. No. 682,988
Int. Cl. C08f 29/36, 29/50, 33/08
U.S. Cl. 260—874
6 Claims

ABSTRACT OF THE DISCLOSURE

A process for forming ionically-bound polyelectrolyte complex resins from polyanions and polycations without the prior purification of these polyions, said process comprising the steps of forming aqueous solutions of each of the two polyions and then simultaneously mixing said solutions so that the unreacted concentration of each of the polyions is maintained below 0.2% by weight of the total water.

RELATED APPLICATIONS

This application is a continuation-in-part of Ser. No. 340,531, filed Jan. 27, 1964 by Alan S. Michaels, now abandoned.

BACKGROUND OF THE INVENTION

This invention relates to the purification of ionically cross-linked polyelectrolyte polymers and pertains more specifically to an improved method of manufacturing such cross-linked polymers in purified form.

It has hitherto been proposed to manufacture ionically cross-linked polyelectrolyte polymers by reacting in an aqueous medium a synthetic organic polymer containing dissociable anionic groups and another synthetic organic polymer containing dissociable cationic groups. However, the polymers employed as starting materials (which polymers can be called polyanion and polycations) usually contain, in the form in which they are commercially available, substantial quantities of impurities, particularly inorganic salts. It has been demonstrated in the art that rather small quantities of salt impurities, e.g. NaBr and NaCl, which are normally associated with the commercial forms of polyelectrolyte resins can prevent the formation of stoichiometric and homogeneous polyelectrolyte complex resins. See, for example, the article entitled "Polycation-Polyanion Complexes: Preparation and Properties of Poly - (Vinylbenzyltrimethyl Ammonium), Poly-Styrenesulfonate)" and appearing in the Journal of Physical Chemistry, 65, 1765 (1961). As indicated in that article, the preparation of polyelectrolyte complex polymers has heretofor been carried out after purifying the commercially-available polyions to remove therefrom. When such purifying was not done, use of relatively complex shielding solvents comprising organic solvents was required. Moreover, the interaction of the two polymers containing dissociable groups of opposite charge itself produces a salt as a byproduct which is an additional impurity present even when the starting polymers have been specially purified before reaction.

SUMMARY OF THE INVENTION

One object of the present invention is to provide a method of manufacture of ionically cross-linked polyelectrolyte polymers in purified form.

Another object is to provide a method of manufacture of such cross-linked polymers in purified form from impure starting polymers.

Other and further objects will be apparent from the description which follows.

It has now been discovered that if the concentration of the unreacted polyanion polymer and unreacted polycation polymer are each maintained below 0.2% by weight in the reaction mass, salt concentrations up to about 0.3 N can tolerate without interfering with the ability of the polyions to form pure homogeneous and stoichiometric materials. It is possible to obtain an ionically cross-linked polyelectrolyte polymer in highly purified form by reacting an aqueous solution of a synthetic organic linear polymer containing a plurality of dissociable anionic groups with an aqueous solution of a synthetic organic linear polymer containing a plurality of dissociable cationic groups, provided that the two solutions are mixed under such conditions that the concentration of each polymer containing dissociable ionic groups in the reaction mixture, before reaction with the other such polymer, does not exceed 0.2% by weight of total reaction mixture.

The reaction is best carried out by first preparing separate aqueous solutions of the polymer containing anionic groups and of the polymer containing cationic groups. The polymers used in preparing the solutions need not be pure but may be any of the commercially available polymers containing the usual impurities associated with such polymers. Moreover, the concentration of each such solution may vary over a wide range; most conveniently the concentration of each polymer will be from 2% to 20% by weight. The separate solutions of polymers are then introduced simultaneously into a large mass of water, the rate of addition of each solution being adjusted so that the two reactive polymers are present in approximately stoichiometric proportions at all times. The mass of water into which the two solutions are mixed must be sufficiently large so that the total amount of water in the mixture at any time during the procedure is at least 500 times the weight of any free unreacted polymer before it has reacted to form an ionically cross-linked polyelectrolyte polymer. The individual solutions of separate polymers may be introduced as continuous streams into the mass of water, or they may be introduced intermittently, even sequentially provided that the concentration of free unreacted polymer present at any time does not exceed 0.2% by weight. The reaction mixture is stirred vigorously and effectively throughout the course of addition of the two reactive polymer solutions until the two polymers have reacted to form the ionically cross-linked polymer gel in finely divided solid form, i.e. in the form of a flocculant precipitate which may be separated from the reaction mixture by any conventional procedure such as filtration, centrifugation, etc., the filter cake or other mass of finely divided solid material preferably being washed at least once with water in order to remove any residual impurities present in the mother liquor.

The procedure may be carried out either as a batch process by introducing a limited quantity of each reactive polymer solution into a predetermined mass of water or it may be carried out as a continuous process by metering the two reactive polymer solutions into a flowing stream of water subjected to continuous and vigorous agitation and turbulence.

In typical embodiments of the invention quantities of these commercial materials are dissolved in solutions so that polyion concentrations of from 2 to 20% based on total polyion and water content are attained. These concentrations roughly correspond to maximum salt impurity concentrations of from about 0.03 to 0.3 N when using the polyelectrolyte reactants presently available in drum and/or bagged quantities. Then solutions of polyanion and polycation are mixed together, preferably into a larger mass of water, to enable the reaction of the polyanion and polycation and consequent formation of ionically crosslinked polyelectrolyte complex resin gel.

The total amount of water required to keep the unreacted polycation and unreacted polyanion at the desired low concentration level is minimized by providing good agitation which keeps the concentration of polycation and polyanion homogeneous or very close to homogeneous, throughout the total aqueous reaction medium.

Among the organic linear polymers which may be interacted to produce the ionically cross-linked gel structures which are useful in the present invention are those having a sufficiently high molecular weight (preferably at least 50,000) to be solid and capable of film formation and containing a plurality of dissociable ionic groups (anionic or cationic as the case may be) chemically bonded to the polymer chain, preferably at least one such ionic group for every six repeating monomeric units in the chain, or at least one such ionic group for each average chain interval of twelve carbon atoms in polymers containing a chain of carbon atoms in the backbone of the polymer molecule. Such polymers include, as those having anionic groups, sodium polystyrene sulfonate, sodium polyvinyl toluene sulfonate, sodium polyacrylate, sodium salts of the hydrolyzed copolymers of styrene with maleic anhydride, sodium polyvinyl sulfonate, and the corresponding free acids (when sufficiently water-soluble) as well as corresponding salts of other alkali metals. Polymers containing cationic groups include polyvinyl benzyl trimethyl ammonium chloride, polyethyleneimine, polyvinyl pyridine, poly (dimethyl-aminoethyl methacrylate), quaternized polyethylene imine, quaternized poly (dimethylaminoethyl) methacrylate, polyvinyl methyl pyridinium chloride, and the like. The preferred polymers are those containing sulfonate groups and those containing quaternary ammonium groups. The relative proportions of the two polymers containing oppositely charged ionic groups used in making the ionically cross-linked polyelectrolyte polymers must be maintained as nearly stoichiometric as possible. If the proportion of either of the polymers containing oppositely charged ionic groups varies by more than about 0.1–0.2% from stoichiometric, or if the concentration of either free, unreacted polymer in the mixture exceeds about 0.2% by weight, the solid reaction product appears in the form of a non-filterable colloidal precipitate; such a colloidal precipitate, however, may be flocculated and rendered filterable by restoration of the correct proportions provided the departure from the correct proportions has not been excessively great.

Commercial materials were used as polyion starting products in each of the working examples. The poly(sodium styrene sulfonate) was supplied by Dow Chemical Company under the trade name ET–450. It had a molecular weight of 3,000,000 and contained, by weight:

|  | Percent |
|---|---|
| Polymer | 35 |
| NaBr | 33 |
| Monomer | 15 |
| $H_2O$ | 9 |
| $Na_2SO_4$ | 5 |
| NaOH | 2 |

The polyvinyl (benzyltrimethyl ammonium chloride) was obtained from Dow Chemical Company under the trade designation 2X–2611.12. It contained, by weight:

| | |
|---|---|
| Polymer | 33.0 |
| Salts (NaCl) | 10.4 |
| Water | 56.5 |

EXAMPLE 1

Five hundred milliliters of an aqueous solution was prepared containing 5% by weight of sodium polystyrene sulfonate polymer. An equal volume of a separate aqueous solution was prepared containing 5% by weight of polyvinyl benzyl trimethyl ammonium chloride polymer. The two solutions were then introduced simultaneously in the form of continuously flowing streams at the rate of ten milliliters a minute into opposite sides of a vessel containing 4 liters of water stirred with a large size Waring Blendor operated at second speed. After thorough mixing, the combined liquids were subjected to vacuum filtration to separate the ionically cross-linked polyelectrolyte polymer gel in the form of finely divided solid particles from the liquid. After a single washing with an amount of water equal to about 10 to 20 times the weight of the filter cake the ionically cross-linked polyelectrolyte gel was found to be in an extremely pure form containing only a trace of residual inorganic salts.

In the above example, the concentration of NaBr and NaCl is about 0.07 as the formation of polyelectrolyte gel is completed.

EXAMPLE 2

The same process as described above is followed except that the concentration of each of the polyanion and polycation is 15% instead of 5%. The same processing techniques are followed and substantially the same result achieved even though the combined concentration of NaBr and NaCl reach 0.21 N as the process nears completion.

While it is possible to obtain the same results using organic solvents, water is normally preferred because of its much lower cost and the convenience of using it. The term "aqueous solution" as used in the appended claims is intended to embrace both water and mixtures of water with miscible organic solvents.

Although a batch process has been described in the foregoing examples, it will be appreciated that a continuous process may also be used provided that the mass of water into which the two polymer solutions are introduced is sufficiently large, with respect to the total quantity of each polymer, so that the maximum concentration of each unreacted polymer does not exceed 0.2% by weight of the mixture.

Although specific embodiments of the invention have been herein described it is not intended to limit the invention solely thereto, but to include all of the obvious variations and modifications within the spirit and scope of the appended claims.

What is claimed is:

1. A process for forming in purified finely-divided form a homogeneous ionically cross-linked poly-electrolyte gel composition in the presence of dissociable inorganic impurities which process comprises the steps of
    (1) forming separate aqueous solutions of each of
        (a) an organic linear polymer containing a plurality of dissociable anionic groups, said polymer containing salts in substantial quantity and being of commercial grade purity, and
        (b) an organic linear polymer containing a plurality of dissociable cationic groups, said polymer containing salts in substantial quantity and being of commercial grade purity,
    (2) simultaneously mixing said aqueous solutions of said commercial grade polymers into a mass of water at relative rates such that the polymer having dissociable anionic groups and the polymer having dissociable cationic groups are maintained in approximately stoichiometric proportions to form said finely-divided cross-linked gel composition under conditions such that the total amount of water present in said mixture is at least 500 times the weight of any free unreacted polymer, and
    (3) subsequently separating said finely-divided cross-linked gel composition from the aqueous medium.

2. A process as claimed in claim 1 in which each said polymer solution contains from 2 to 20% by weight of the respective polymer.

3. A method as claimed in claim 2 in which said anionic groups are sulfonate and said cationic groups are quaternary ammonium.

4. A method as claimed in claim 2 in which the first said polymer is sodium polystyrene sulfonate and the second said polymer is polyvinyl benzyl trimethyl ammonium chloride.

5. A method as claimed in claim 2 in which each said solution is introduced in the form of a flowing stream into said water mass in the form of a flowing stream.

6. A method as defined in claim 2 in which the maximum salt concentration present during polyelectrolyte gel formation is 0.3 N.

References Cited

Michaels et al.: "Polycation-Polyanion Complexes: Preparation and Properties of Poly-(Vinylbenzyltrimethyl Ammonium), Poly-(Styrene Sulfonate)," Journal of Physical Chemistry, vol. 65, pp. 1765–73 (1961).

MURRAY TILLMAN, Primary Examiner

H. ROBERTS, Assistant Examiner

U.S. Cl. X.R.

260—2.1, 2.2, 29.6, 895, 901